United States Patent
Banerjee et al.

(10) Patent No.: US 8,147,695 B2
(45) Date of Patent: *Apr. 3, 2012

(54) METHOD OF REMOVING PHOSPHORUS FROM WASTEWATER

(75) Inventors: Kashi Banerjee, Moon Township, PA (US); Charles D. Blumenschein, Pittsburgh, PA (US); John Charles Schrader, Pittsburgh, PA (US)

(73) Assignee: I. Kruger Inc., Glen Ellyn, IL (US)

( * ) Notice: Subject to any disclaimer, the term of this patent is extended or adjusted under 35 U.S.C. 154(b) by 67 days.

This patent is subject to a terminal disclaimer.

(21) Appl. No.: 12/911,914

(22) Filed: Oct. 26, 2010

(65) Prior Publication Data

US 2011/0036772 A1  Feb. 17, 2011

Related U.S. Application Data

(63) Continuation of application No. 11/767,010, filed on Jun. 22, 2007, now Pat. No. 7,828,976.

(51) Int. Cl.
*C02F 3/00* (2006.01)
*C02F 1/52* (2006.01)
*C02F 1/58* (2006.01)

(52) U.S. Cl. ........ 210/614; 210/631; 210/709; 210/711; 210/713; 210/714; 210/727; 210/906

(58) Field of Classification Search .................. 210/711
See application file for complete search history.

(56) References Cited

U.S. PATENT DOCUMENTS

| | | | |
|---|---|---|---|
| 4,927,543 A * | 5/1990 | Bablon et al. | 210/711 |
| 5,635,073 A | 6/1997 | Aktor et al. | |
| 5,840,195 A * | 11/1998 | Delsalle et al. | 210/713 |
| 6,210,588 B1 * | 4/2001 | Vion | 210/711 |
| 6,379,549 B1 * | 4/2002 | LePoder et al. | 210/631 |
| 6,447,686 B1 * | 9/2002 | Choi et al. | 210/666 |
| 7,153,431 B2 | 12/2006 | Daugherty | |
| 7,311,841 B2 * | 12/2007 | Binot et al. | 210/666 |
| 7,323,108 B1 * | 1/2008 | Garbett et al. | 210/607 |
| 7,828,976 B2 * | 11/2010 | Banerjee et al. | 210/631 |
| 7,931,822 B2 * | 4/2011 | Kelley et al. | 252/175 |
| 2004/0144728 A1 | 7/2004 | Moller | |
| 2007/0256982 A1 * | 11/2007 | Kelley et al. | 210/724 |

* cited by examiner

*Primary Examiner* — Peter A Hruskoci
(74) *Attorney, Agent, or Firm* — Coats & Bennett, P.L.L.C.

(57) ABSTRACT

A process for removing phosphorus from wastewater wherein an iron or aluminum salt is added to the wastewater. The iron or aluminum salt results in the precipitation of certain iron or aluminum species that include phosphorus adsorption sites. These iron or phosphorus species are settled and become a part of sludge produced in the course of the wastewater treatment process. By recycling substantial portions of the sludge, the concentration of these iron or aluminum species in the wastewater is increased. This increased concentration results in the presence of large quantities of unused phosphorus adsorption sites that attract and adsorb phosphorus, resulting in phosphorus being removed from the wastewater.

25 Claims, 1 Drawing Sheet

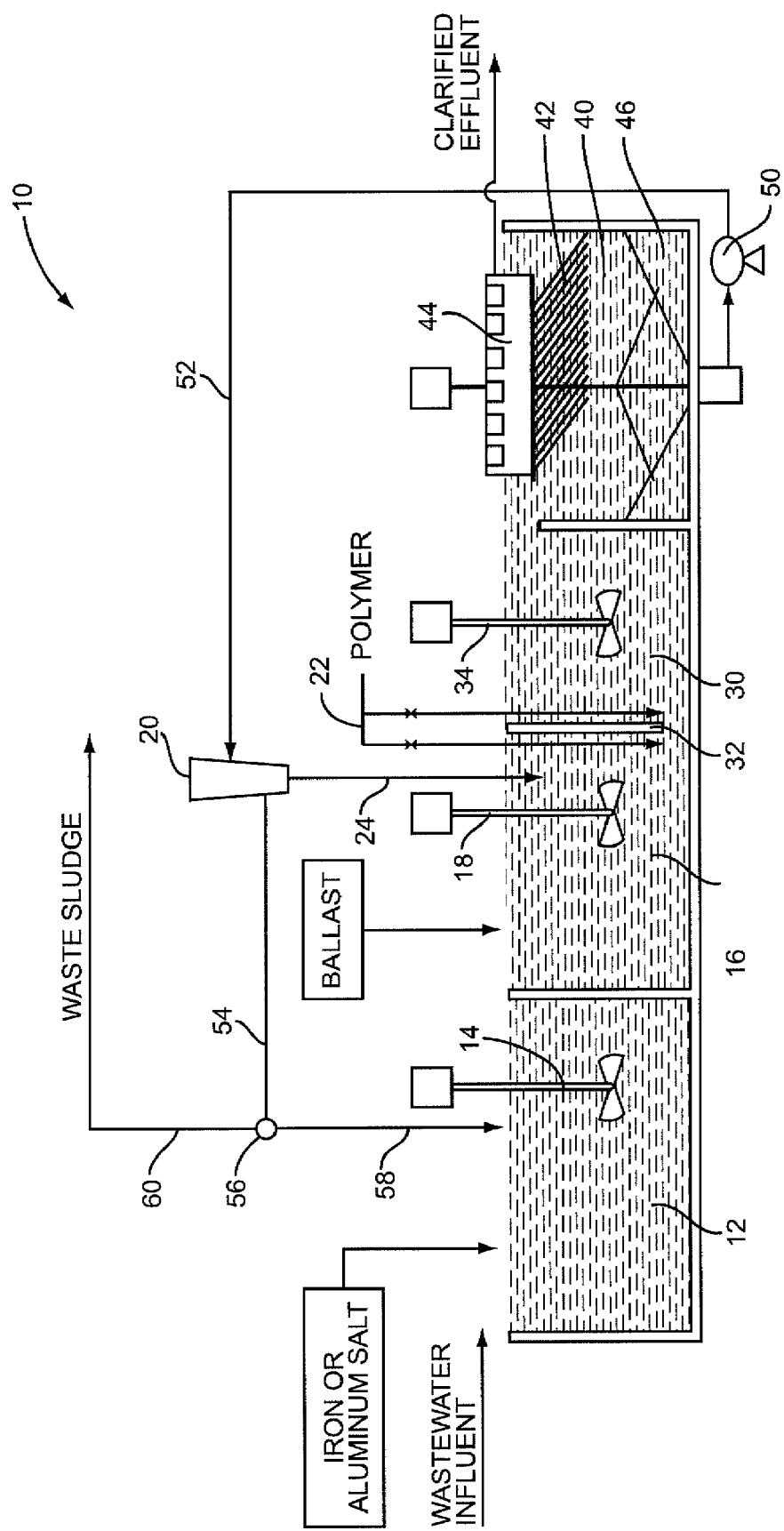

METHOD OF REMOVING PHOSPHORUS FROM WASTEWATER

CROSS-REFERENCE TO RELATED APPLICATION

This is a continuation of U.S. patent application Ser. No. 11/767,010 filed Jun. 22, 2007, now U.S. Pat. No. 7,828,976. The disclosure of this patent application is incorporated herein by reference.

FIELD OF THE INVENTION

The present invention relates to water and wastewater treatment, and more particularly to processes for removing phosphorus from wastewater.

BACKGROUND

Phosphorus is essential to the growth of algae. Because of noxious algal bloom that occurs in surface waters, there is much interest in controlling the amount of phosphorus compounds that enter lakes, rivers and other bodies of water from domestic and industrial waste discharges and natural runoff.

Phosphorus is typically removed from wastewater biologically or chemically. Chemical treatment typically utilizes a chemical such as calcium, iron or aluminum to precipitate phosphorus-containing compounds such as ferric hydroxyphosphate. There are drawbacks and disadvantages to chemical treatment. First, regulatory agencies continue to place more stringent phosphorus reduction demands on wastewater treatment plants. In some cases, wastewater treatment plants are required to reduce phosphorus concentrations to 0.05 mg/l or even lower. It is neither practical nor feasible to accomplish such low level phosphorus reduction by conventional chemical precipitation. To even attempt to achieve low level phosphorus concentrations through chemical treatment, requires increased chemical dosage. This, of course, dramatically increases the cost of chemical treatment. At the same time, with this approach the chemicals are underutilized and wasted because they are not fully reacted with in the process and the unreacted chemicals are disposed of as sludge.

There has been and continues to be a need for a practical and cost effective chemical process for reducing phosphorus concentrations to very low levels.

SUMMARY OF THE INVENTION

Iron or aluminum salt is mixed with wastewater influent resulting in the co-precipitation of iron or aluminum hydroxyphosphate and other iron or aluminum hydroxide species that include phosphorus adsorption sites. To reduce the phosphorus concentration in the wastewater to very low levels, substantial portions of the sludge generated in the course of the process is recycled. Because the sludge includes the iron or aluminum species having unused phosphorus adsorption sites, recycling the sludge concentrates these species in the wastewater. By continuously recycling the iron or aluminum phosphorus adsorption species it follows that phosphorus in the wastewater is adsorbed onto the species and ultimately removed from the wastewater with wasted sludge.

In one particular embodiment, the process for removing phosphorus is incorporated into a ballasted flocculation wastewater treatment process. In this process, an iron or aluminum salt is added to the influent wastewater. This results in a co-precipitation process where iron or aluminum phosphate is precipitated as well as other iron or aluminum species that include phosphorus adsorption sites. These iron or aluminum phosphorus adsorption species are settled with the sludge produced by the ballasted flocculation process. The sludge is then routed to a separator which separates ballast material from the sludge and a substantial portion of the separated sludge, including the iron or aluminum phosphorus adsorption species, is recycled back to the process. The sludge recycle rate is substantial and increases the concentration of the iron or aluminum phosphorus adsorption species in the wastewater. Maintaining a high concentration of these species, results in the phosphorus in the wastewater being adsorbed onto these iron or aluminum species and the reduction of the phosphorus concentration in the wastewater to low levels, levels of 0.05 mg/l and below.

BRIEF DESCRIPTION OF THE DRAWINGS

FIG. 1 is a schematic illustration of a wastewater treatment process that utilizes a chemical treatment to reduce the phosphorus concentration in the wastewater being treated.

DESCRIPTION OF EXEMPLARY EMBODIMENTS

The process disclosed is a wastewater treatment process for removing phosphorus. Generally the process entails adding an iron or aluminum salt to the influent wastewater to be treated. As used herein the term "wastewater" includes water and the term "wastewater treatment" encompasses water treatment. The iron or aluminum salt reacts with water and phosphorus to form a precipitant, ferric hydroxyphosphate or aluminum hydroxyphosphate. In addition, the iron or aluminum salt produces other precipitants that are referred to as iron or aluminum adsorption materials or species, and which include phosphorus adsorption sites. These iron or aluminum adsorption materials or species eventually end up in the sludge produced by the wastewater treatment process. A substantial portion of the sludge that includes the iron or the aluminum adsorption materials is recycled and mixed with the wastewater, thereby concentrating the iron or aluminum adsorption material in the wastewater. Phosphorus is adsorbed by the concentrated iron or aluminum adsorption material in the wastewater. The recycling of the sludge also contributes to the growth of robust crystals of ferric and aluminum hydroxide, and during crystal growth the adsorbed phosphate molecules are properly placed within the crystal lattice. By selectively adding iron or aluminum salt and by recycling substantial portions of the sludge having the iron or aluminum adsorption material therein, influent wastewater streams having phosphorus concentrations of about 2 mg/l and higher can be treated to remove phosphorus such that the phosphorus concentration in the effluent is 0.05 mg/l or lower.

The process for removing phosphorus from wastewater can be carried out in various types of wastewater treatment systems. One such system is a ballasted flocculation system depicted in FIG. 1. Before describing the phosphorus removal process, it is beneficial to briefly review the basic components of the ballasted flocculation system, indicated generally by the numeral 10 in FIG. 1.

In the case of the embodiment illustrated herein, the ballasted flocculation system 10 includes a coagulation or mixing tank 12 having a mixer 14 mounted therein. It should be noted that in some ballasted flocculation systems that a coagulation tank is not required as a coagulant can be mixed with influent wastewater passing through a conduit to the ballasted flocculation system 10.

In any event, in the case of the ballasted flocculation system 10 shown in FIG. 1, downstream from the coagulation tank 12 is an injection tank 16. Injection tank 16 includes a mixer 18 and a polymer or flocculant injection line 22. Disposed over the injection tank 16 is a sludge separator which is typically a hydrocyclone 20. Extending from the hydrocyclone 20 towards the injection tank 16 is a ballast feed line 24. A ballast such as microsand is initially added to the wastewater in the injection tank 16. Thereafter hydrocyclone 20 separates sand from sludge and returns the sand to the injection tank 16 via line 24. From time-to-time additional sand may be added to the injection tank 16 because the hydrocyclone may not be able to separate 100% of the ballast.

Disposed adjacent the injection tank 16, and downstream therefrom, is a maturization or flocculation tank 30. A partial wall 32 separates the maturization or flocculation tank 30 from the injection tank 16. Further, a mixer 34 is mounted in the maturization or flocculation tank 30. As noted above, a flocculant is typically added to the wastewater in the injection tank 16. In some cases, as illustrated in FIG. 1, the flocculant can also be added to the maturization or flocculation tank 30.

Disposed downstream from the maturization or flocculation tank 30 is a settling tank 40. In typical fashion, the settling tank 40 includes separator plates or lamella 42 and a collection trough 44 for receiving clarified effluent and channeling the clarified effluent to an outlet of the settling tank. Disposed adjacent the bottom of the settling tank 40 is a scraper 46 for scraping settled sludge and directing the settled sludge to a sludge outlet formed in the bottom of the settling tank 40.

A sludge pump 50 is utilized to pump sludge from the settling tank 40 through line 52 to the hydrocyclone 20. Extending from the hydrocyclone 20 is a sludge line 54 that carries sludge separated by the hydrocyclone 20. Line 54 leads to a flow splitter 56 which includes a control valve for splitting the flow of sludge and directing one portion of the sludge into a sludge recycle line 58 and another portion of the sludge to a sludge waste line 60. Note that the sludge recycle line 58 is operative to recycle sludge back to the main stream of the wastewater treatment process.

Ballasted flocculation systems of the type just described are known. For a more complete understanding of ballasted flocculation, reference is made to U.S. Pat. Nos. 4,927,543; 5,840,195; and 7,153,431. The disclosures found in these three patents are expressly incorporated herein by reference.

Phosphorus concentrations in the wastewater passing through the ballasted flocculation system 10 can be substantially reduced by concentrating in the wastewater iron or aluminum species that possess phosphorus adsorption sites. Typically, phosphorus concentrations in wastewater are on the order of 2.5 mg/l and above. Regulatory agencies in some geographical areas continue to impose stringent requirements on phosphorus concentrations in wastewater effluents. Now, in some cases, it is mandatory or desirable for effluent phosphorus concentrations to be as low as 0.05 mg/l or lower. Even in some cases it may be desirable to reduce total phosphorus concentrations to below 0.01 mg/l.

The process or method described herein entails mixing an iron or aluminum salt with the wastewater. In the case of the ballasted flocculation system 10 discussed above, an iron salt such as ferric chloride or an aluminum salt such as aluminum sulfate is mixed with the wastewater in the coagulation tank 12. As used herein, the term "iron salt" or "aluminum salt" includes any water soluble compounds of iron or aluminum which are capable of liberating iron or aluminum ions upon hydrolysis. The dosage of the iron or aluminum salt will vary. Dosage will depend on a number of factors such as influent water quality, required effluent water quality, reaction pH, temperature, and the phosphorus concentration in the influent wastewater to be treated.

Empirically and by analysis, it was determined that an effective ratio, by weight, of iron or aluminum to the influent phosphorus is preferably about 5-50 to 1 or about 15-50 to 1. In a series of tests conducted with ferric chloride as the iron salt, it was determined that a ratio of $Fe^{+3}$ to total phosphorus of about 35:1 was both cost effective and, from a process point of view, efficient in removing phosphorus to less the 0.05 mg/l.

Mixing an iron or aluminum salt with the wastewater results in conventional phosphorus precipitation. That is, mixing ferric chloride or aluminum sulfate with the wastewater will chemically precipitate ferric hydroxyphosphate or aluminum hydroxyphosphate. However, conventional phosphorus precipitation processes alone are not practical when the goal is to reduce the phosphorus concentrations to extremely low levels.

In addition to precipitating iron phosphate or aluminum phosphate, the iron or aluminum salt co-precipitates other species of iron or aluminum. These precipitated compounds can be referred to as iron hydroxide/oxy-hydroxide or aluminum hydroxide/oxy-hydroxide. These other species, which are also sometimes referred to as iron or aluminum adsorption material or species, include an abundance of phosphorus adsorption sites. That is, when present in the wastewater, these additional iron or aluminum precipitated species will result in phosphorus being adsorbed thereto. When allowed to proceed stochiometrically, by allowing sufficient time in the wastewater, these materials are effective in removing essentially all the phosphorus from the wastewater. However, under normal wastewater treatment conditions, the concentration of iron or aluminum adsorption material is insufficient to significantly adsorb phosphorus from the wastewater. Thus, such wastewater treatment processes are ineffective to reduce the phosphorus concentrations to very low levels such as less than 0.05 mg/l.

In the course of the wastewater treatment process, the iron or aluminum species having the phosphorus adsorption sites will make up a portion of the sludge. That is, the sludge that settles to the bottom of the settling tank 40 will include the iron or aluminum adsorption material. Sludge from the bottom of the settling tank 40 is pumped to the hydrocyclone 20. There ballast, such as microsand, is separated from the sludge entering the hydrocyclone 20. Separated sludge including the iron or aluminum adsorption material is directed to the flow splitter 56. Typically this includes a valve that splits the stream of sludge in line 54 into two streams, a recycle stream that is directed into line 58 and a sludge waste stream that is directed into line 60. The sludge directed into line 58 is recycled and mixed with the wastewater influent passing through the ballasted flocculation system. Recycle line 58 may be connected at various places in the ballasted flocculation system 10, but in the embodiment illustrated is directed into the coagulation tank 12 where it is mixed with the influent wastewater and the iron or aluminum salt that is continuously added.

To concentrate the iron or aluminum species in the wastewater, a substantial portion including at least 90% of the resulting sludge is recycled through line 58 and mixed with the wastewater influent. The quantity of sludge recycled varies depending on numerous factors. In the embodiment illustrated herein a number of factors are considered in arriving at a sludge recycle rate that is effective to achieve very low levels of phosphorus, levels on the order of 0.05 mg/l and lower. One factor in determining the recycle rate is the amount of solids that are precipitated by mixing the iron or aluminum salt mixed with the wastewater influent in the coagulation tank 12. Based on the flow of wastewater, the chemical makeup of the wastewater, and the amount of the iron or aluminum salt added, it can be determined how much solids is precipitated by the addition of the iron or aluminum salt. This determination only relates to the solids that are or should be precipitated by a full reaction due to the addition of the iron or aluminum salt. It does not include inert suspended solids that are already in the wastewater.

In one embodiment the sludge recycle rate is based in part at least on a multiple of the quantity of solids, expressed in mg/l, precipitated by the iron or aluminum salt. It is postulated that recycling sludge at a rate such that the solids content of the sludge recycled is approximately 10 to 30 times the solids precipitated by the addition of the iron or aluminum salt will be effective in most cases to reduce total phosphorus concentrations to levels of 0.05 mg/l and lower. Thus, for example, if the continuous addition of the iron or aluminum salt results in 200 lbs of solids precipitation in a day, then the recycle rate of the sludge is adjusted such that the amount of solids recycled to the wastewater would be approximately 2,000 to 6,000 lbs per day.

In implementing one particular process it may be desirable to begin with a sludge recycle rate at the lower end of the range. Once the process is started the phosphorus concentration in the wastewater effluent is continuously or periodically monitored. If after steady state conditions are reached the phosphorus concentration in the wastewater effluent is not reduced to the target level, then the operator can adjust the sludge recycle rate. This effectively means that the sludge recycle rate is increased and the sludge waste rate is decreased. The process is monitored at this sludge recycle rate to determine if the target phosphorus concentration level is met. If not, the sludge recycle rate is again increased and this process is continued until the target phosphorus concentration level is reached. Under some conditions the ration of $Fe^{+3}$ to phosphorus may also be adjusted.

EXAMPLE

In this example, the flow of the influent wastewater is 1 MGD and includes a total phosphorus concentration of 2.5 mg/l. The iron salt selected is ferric chloride and the dosage of ferric chloride is based on a ratio of $Fe^{+3}$ to total phosphorus of approximately 10:1. Further, based on the water chemistry and the dosage of ferric chloride, it is determined that the addition of the ferric chloride results in the precipitation of 50 mg/l of solids. This, for a 1 MGD operation, will result in approximately 417 lbs of precipitated solids per day. Keep in mind that this amount of solids does not include suspended solids in the wastewater prior to treatment with the ferric chloride. Thus, using 20 as a multiplier it is desirable to achieve a sludge recycle rate that will recycle 8,345 lbs of solids per day. Assuming a sludge concentration of 1% solids, a recycle rate of approximately 100,000 gal/day will yield approximately 8,345 lbs of solids per day. With a recycle rate of 100,000 gal/day, this will mean that the rate at which sludge is wasted is about 5000 gal/day. Based on the same assumption that the solids constitutes 1% of the sludge, the amount of solids wasted per day would be approximately 417 lbs, essentially the same as the amount of solids precipitated by the addition of the iron or aluminum salt. The pH of the wastewater treated is monitored and a pH range of approximately 6.5 to 8.5 is maintained. With the sludge recycle rate discussed above it is postulated that the ratio of the iron to total phosphorus in the wastewater, after steady state conditions are reached, would be approximately 300-400 to 1. Utilizing this process, it is expected that the phosphorus concentration in the clarified effluent would be less than 0.05 mg/l.

By recycling the sludge, the process concentrates the iron or aluminum phosphorus adsorption species, and at the same time increases the residency time of the iron or aluminum phosphorus adsorption species. More particularly, by recycling the sludge containing the iron or aluminum hydroxide molecules, the process concentrates the solids (TSS). These solids contain significant amounts of phosphorus adsorption sites. By recirculating the sludge, the utilized adsorption sites are used up by phosphate molecules. Recycling also increases the residency time of the sludge in the system. While the actual contact time of the solids with the untreated wastewater does not change, the concentration of the solids in direct contact with the untreated wastewater increases significantly. This constitutes the driving force and enhances phosphorus removal from the wastewater.

The process for removing phosphorus as discussed above can be employed in various ways. As described in the context of FIG. 1, the phosphorus removal process can be carried out in a ballasted flocculation process. In addition, the ballasted flocculation process described with respect to FIG. 1 can be used to polish the effluent produced by a biological treatment process. In that regard the ballasted flocculation process removes phosphorus in the effluent of the biological process. Moreover, the process for removing phosphorus can be employed in a variety of wastewater treatment processes—not just a ballasted flocculation process. For example, this process for removing phosphorus can be utilized in wastewater treatment processes that produce sludge. By utilizing precipitated iron or aluminum phosphorus adsorbing species and recycling substantial portions of the sludge, the concentration or iron or aluminum adsorption material is increased to the level such that it is effective in adsorbing substantial quantities of phosphorus, and in the process, lowers the phosphorus level in the effluent to low levels, even levels on the order of less than 10 ppb.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:
1. A method of removing phosphorous from wastewater comprising:
    adding an iron or aluminum salt to the wastewater;
    removing phosphorous from the wastewater by precipitating phosphorous as ferric hydroxyphosphate or aluminum hydroxyphosphate;
    in addition to precipitating ferric hydroxyphosphate or aluminum hydroxyphosphate from the wastewater, precipitating iron or aluminum phosphorus adsorption species having phosphorous adsorption sites thereon;
    clarifying the wastewater and producing a clarified effluent and sludge having the iron or aluminum phosphorus adsorption species therein;
    concentrating the iron or aluminum phosphorus adsorption species in the wastewater by recycling portions of the sludge having the iron or aluminum phosphorus adsorption species therein and mixing the recycled sludge with the wastewater being treated;

removing phosphorous from the wastewater by adsorbing phosphorous onto the concentrated iron or aluminum phosphorus adsorption species in the wastewater;

monitoring a phosphorus concentration in the clarified effluent; and adjusting a sludge recycle rate to concentrate the iron or aluminum phosphorous adsorption species in the wastewater such that the clarified effluent includes a phosphorous concentration of 0.05 mg/L or less.

2. The method of claim 1 including basing, in part at least, the amount of iron or aluminum salt added to the wastewater on the phosphorous concentration of the wastewater before treatment.

3. The method of claim 1 wherein adding the iron or aluminum salt causes solids to be precipitated from the wastewater, and wherein the amount of sludge recycled is based, in part at least, on the amount of solids precipitated by the addition of the iron or aluminum salt.

4. The method of claim 2 wherein the iron or aluminum salt is added to the wastewater in an amount such that the ratio of iron or aluminum to phosphorous is approximately 5-50 to 1.

5. The method of claim 4 wherein the iron or aluminum salt is added to the wastewater in an amount such that the ratio of the iron or aluminum to phosphorous is approximately 35 to 1.

6. The method of claim 1 wherein the sludge includes solids and the method includes recycling sludge at a rate such that the solids content of the sludge recycled is approximately 10-30 times the solids precipitated by adding iron or aluminum salt.

7. The method of claim 6 wherein the amount of sludge recycled is equal to approximately 20 times the amount of solids precipitated from the wastewater by adding the iron or aluminum salt to the wastewater.

8. The method of claim 1 including selecting a sludge recycle rate, determining the phosphorous concentration in a clarified effluent, and adjusting the sludge recycle rate until the phosphorous concentration in the clarified effluent is 0.05 mg/l or less.

9. The method of claim 8 wherein the wastewater, prior to treatment, includes a phosphorus concentration of 0.7 mg/l or more.

10. The method of claim 1 including maintaining the pH of the water in a range of approximately 6.5 to 8.5.

11. The method of claim 1 including:
basing, in part at least, the amount of iron or aluminum salt added to the wastewater on the phosphorus concentration of the wastewater before treatment; and
wherein adding the iron or aluminum salt causes solids to be precipitated from the wastewater, and wherein the amount of sludge recycled is based, in part at least, on the amount of solids precipitated by the addition of the iron or aluminum salt.

12. The method of claim 1 wherein concentrating the iron or aluminum phosphorus adsorption species includes recycling at least 90% of the sludge produced by clarifying the wastewater and mixing the recycled sludge with the wastewater to be treated.

13. The method of claim 1:
wherein the iron or aluminum salt is added to the wastewater in amounts such that the ratio of the iron or aluminum to phosphorus in the wastewater is approximately 5-50 to 1;
wherein the sludge includes solids and the method includes recycling sludge at a rate such that the solids content of the sludge recycled is approximately 10-30 times the solids precipitated by adding the iron or aluminum salt; and wherein the phosphorus concentration in the wastewater before treatment is 0.7 mg/l or greater, and wherein the method substantially removes phosphorus from the wastewater by producing a clarified effluent having a phosphorus concentration of 0.05 mg/l or less.

14. The method of claim 13 wherein the iron or aluminum phosphorus adsorption species include iron hydroxide, iron oxy-hydroxide, aluminum hydroxide, or aluminum oxy-hydroxide.

15. The method of claim 1 including biologically treating the wastewater prior to removing phosphorous from the wastewater such that the method for removing phosphorous from the wastewater functions as a polishing process for removing phosphorous from the wastewater after the wastewater has been biologically treated.

16. The method of claim 15 wherein the method for recovering phosphorous from the wastewater includes subjecting the wastewater to a ballasted flocculation process and includes:
mixing a flocculent with the wastewater;
mixing an insoluble granular material with the wastewater that results in the formation of ballasted flocs where the ballasted flocs include the sludge having the iron or aluminum phosphorous adsorption species therein;
directing the sludge to a separator and separating the insoluble granular material from the sludge to yield separated sludge; and
recycling a substantial portion of the separated sludge so as to concentrate the iron or aluminum phosphorous adsorption species in the wastewater.

17. A method of biologically treating wastewater and producing a treated effluent, and after biologically treating the wastewater, removing phosphorous from the treated effluent, the method comprising:
biologically treating wastewater and producing the treated effluent; and
removing phosphorous from the treated effluent by:
i. directing the treated effluent to a mixing tank;
ii. mixing an iron or aluminum salt with the treated effluent in the mixing tank;
iii. co-precipitating from the treated effluent iron or aluminum hydroxyphosphate and iron or aluminum phosphorous adsorption species having phosphorous adsorption sites;
iv. mixing a flocculent with the treated effluent;
v. mixing insoluble granular material with the treated effluent that results in the formation of ballasted flocs;
vi. directing the treated effluent and the ballasted flocs to a settling tank and separating clarified effluent from sludge which includes the insoluble granular material and the iron or aluminum phosphorous adsorption species;
vii. after separating the clarified effluent from the sludge, directing the sludge to a separator, and separating the insoluble granular material from the sludge to yield separated sludge;
viii. concentrating the iron or aluminum phosphorous adsorption species in the wastewater by recycling a substantial portion of the separated sludge and mixing the separated sludge with the treated effluent causing the treated effluent to be concentrated with the iron or aluminum phosphorous adsorption species;
ix. wasting a portion of the separated sludge;

x. monitoring a phosphorus concentration in the clarified effluent; and xi. adjusting a sludge recycle rate to concentrate the iron or aluminum phosphorous adsorption species in the treated effluent such that the phosphorous concentration in the clarified effluent is 0.05 mg/L or less.

18. The method of claim 17 including concentrating the iron or aluminum phosphorus adsorption species by adding iron or aluminum salt to the treated effluent such that the ratio of iron or aluminum to phosphorus added to the treated effluent is approximately 15-50 to 1; and continuously recycling separated sludge and mixing a substantial portion of the separated sludge with the treated effluent.

19. The method of claim 17, wherein concentrating the iron or aluminum phosphorus adsorption species includes recycling at least 90% of the separated sludge to the mixing tank and mixing the recycled separated sludge with the treated effluent.

20. The method of claim 17 wherein the ratio of the iron or aluminum to phosphorous added to the treated effluent is approximately 35 to 1.

21. The method of claim 17 including recycling the separated sludge at a rate such that the solids content of the separated sludge recycled is approximately 10 to 30 times the solids precipitated from the treated effluent by adding the iron or aluminum salt to the treated effluent.

22. The method of claim 17 wherein the concentration of phosphorous in the treated effluent is greater than 0.7 mg/l and wherein the method includes utilizing the iron or aluminum phosphorus adsorption species to adsorb phosphorous and produce an effluent having a phosphorous concentration of 0.05 mg/l or less.

23. The method of claim 17 including splitting the separated sludge into two streams, a sludge recycle stream and a sludge waste stream, and adjusting the flow of the two streams such that the flow of the sludge recycle stream is based in part at least on the amount of solids precipitated by adding the iron or aluminum salt.

24. The method of claim 23 wherein adjusting the flow of the sludge recycle stream and sludge waste stream results in the sludge recycle stream including a solids content of approximately 10 to 30 times the solids precipitated from the treated effluent by adding the iron or aluminum salt to the wastewater.

25. The method of claim 17 including:
adding the iron or aluminum salt to the treated effluent in amounts such that the ratio of the iron or aluminum to phosphorous in the treated effluent is approximately 5-50 to 1;
recycling the separated sludge at a rate such that the solids concentration of the separated sludge recycled is approximately 10-30 times the solids precipitated by adding the iron or aluminum salt; and
wherein the phosphorous concentration in the treated effluent is approximately 0.7 mg/L or higher, and wherein the method removes phosphorous from the treated effluent by producing the clarified effluent having a phosphorous concentration of 0.05 mg/L or less.

* * * * *